US011892637B2

(12) United States Patent
Otsuka

(10) Patent No.: US 11,892,637 B2
(45) Date of Patent: Feb. 6, 2024

(54) IMAGE GENERATION APPARATUS, HEAD-MOUNTED DISPLAY, CONTENT PROCESSING SYSTEM, AND IMAGE DISPLAY METHOD

(71) Applicant: Sony Interactive Entertainment Inc., Tokyo (JP)

(72) Inventor: Katsushi Otsuka, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 17/406,333

(22) Filed: Aug. 19, 2021

(65) Prior Publication Data
US 2021/0382313 A1    Dec. 9, 2021

Related U.S. Application Data

(63) Continuation of application No. 16/824,401, filed on Mar. 19, 2020, now Pat. No. 11,126,001.

(30) Foreign Application Priority Data

Mar. 29, 2019  (JP) ................................ 2019-068187
Oct. 8, 2019   (JP) ................................ 2019-185339

(51) Int. Cl.
*G02B 27/01* (2006.01)

(52) U.S. Cl.
CPC ..... *G02B 27/0172* (2013.01); *G02B 27/0101* (2013.01); *G02B 2027/014* (2013.01);
(Continued)

(58) Field of Classification Search
CPC ............ G02B 27/0172; G02B 27/0101; G02B 2027/0123; G02B 2027/014;
(Continued)

(56) References Cited

U.S. PATENT DOCUMENTS 10,271,042 B2 *  4/2019  Rougeaux ........... G02B 27/0093
10,310,595 B2 *  6/2019  Tatsuta .................... G06F 3/147
(Continued)

FOREIGN PATENT DOCUMENTS

JP    H05-176216 A    7/1993
JP    H07-037079 A    2/1995
(Continued)

OTHER PUBLICATIONS

United States Office Action dated Feb. 9, 2021, from corresponding U.S. Appl. No. 16/824,401.
(Continued)

*Primary Examiner* — Ibrahim A Khan
(74) *Attorney, Agent, or Firm* — XSENSUS LLP

(57) ABSTRACT

The present disclosure provides a head-mounted display that includes an image generation device generating a display image to be viewed through an eyepiece disposed in front of a display panel, the image generation device including a source image reception control section that receives a source image, a distorted image generation section that generates data on pixels in a display image obtained by giving the source image a distortion corresponding to the eyepiece, a partially distorted image storage section that stores the data on the pixels in an order of data generation, and an image display control section that, whenever data on a predetermined number of pixels smaller than a total number of pixels in the display image is stored in the partially distorted image storage section, outputs the stored data to the display panel; the display panel that sequentially displays data outputted from the image generation device; and a content processing device that generates the source image and transmits the generated source image to the head-mounted display.

14 Claims, 9 Drawing Sheets

(52) U.S. Cl.
CPC ............... *G02B 2027/0123* (2013.01); *G02B 2027/0178* (2013.01)

(58) Field of Classification Search
CPC ...... G02B 2027/0178; G02B 2027/011; G02B 2027/0116; G02B 2027/0134; G02B 2027/0138; G02B 2027/0147
See application file for complete search history.

(56) References Cited

U.S. PATENT DOCUMENTS

| | | | | |
|---|---|---|---|---|
| 10,484,577 | B1* | 11/2019 | Zhang | H04N 3/1562 |
| 10,499,042 | B2* | 12/2019 | Babu | G06T 11/001 |
| 11,076,143 | B1* | 7/2021 | Bainbridge | H04N 13/106 |
| 11,423,519 | B2* | 8/2022 | Pohl | G02B 27/0172 |
| 2009/0315887 | A1* | 12/2009 | Yamaguchi | G02B 27/0172 345/428 |
| 2013/0321390 | A1* | 12/2013 | Latta | G06T 19/006 704/E21.001 |
| 2015/0123991 | A1* | 5/2015 | Yarosh | H04N 7/141 345/629 |
| 2016/0035140 | A1* | 2/2016 | Bickerstaff | G06T 19/006 345/633 |
| 2016/0080645 | A1* | 3/2016 | Ohba | H04N 13/156 348/207.11 |
| 2016/0091720 | A1* | 3/2016 | Stafford | G02B 27/0172 345/8 |
| 2016/0314564 | A1* | 10/2016 | Jones | G06T 5/006 |
| 2016/0328882 | A1* | 11/2016 | Lee | G06T 5/006 |
| 2017/0054963 | A1* | 2/2017 | Kasazumi | H04N 13/30 |
| 2017/0059859 | A1* | 3/2017 | Haberl | G02B 27/0101 |
| 2017/0083084 | A1* | 3/2017 | Tatsuta | G06F 3/011 |
| 2017/0094163 | A1* | 3/2017 | Ohba | H04N 7/0127 |
| 2017/0193687 | A1* | 7/2017 | Lo | G06T 3/0093 |
| 2017/0323419 | A1* | 11/2017 | Holland | G09G 5/397 |
| 2017/0329136 | A1* | 11/2017 | Bates | G02B 27/0172 |
| 2018/0164877 | A1* | 6/2018 | Miller | G06F 3/012 |
| 2019/0244582 | A1* | 8/2019 | Fruchter | G06T 15/503 |
| 2019/0371070 | A1* | 12/2019 | Jang | G09G 3/001 |
| 2020/0090575 | A1* | 3/2020 | Martin | G06F 3/012 |
| 2020/0296424 | A1* | 9/2020 | Wang | H04N 19/70 |

FOREIGN PATENT DOCUMENTS

| | | |
|---|---|---|
| JP | H11-153987 A | 6/1999 |
| JP | 2010-050838 A | 3/2010 |
| JP | 2017-188757 A | 10/2017 |
| JP | 2018-049039 A | 3/2018 |
| WO | 2013/125138 A1 | 4/2015 |
| WO | 2017/212679 A1 | 12/2017 |

OTHER PUBLICATIONS

United States Notice of Allowance dated Jun. 1, 2021, from corresponding U.S. Appl. No. 16/824,401.
Japanese Office Action dated May 9, 2023 for the Corresponding Japanese Patent Application No. 2019-185339.

\* cited by examiner

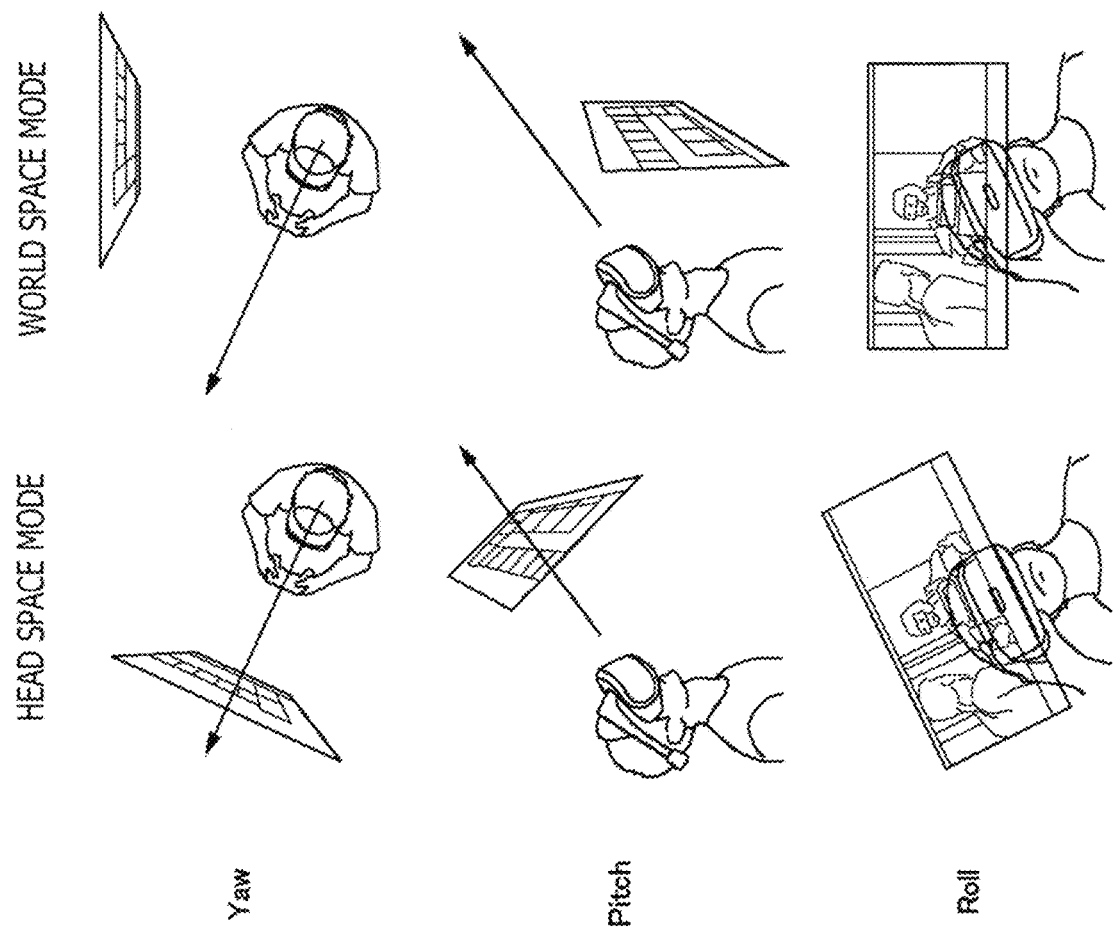
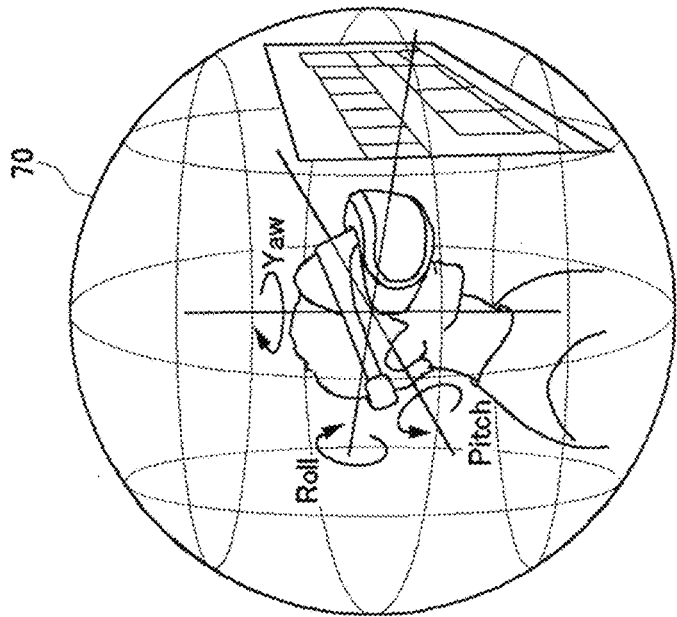
FIG. 5

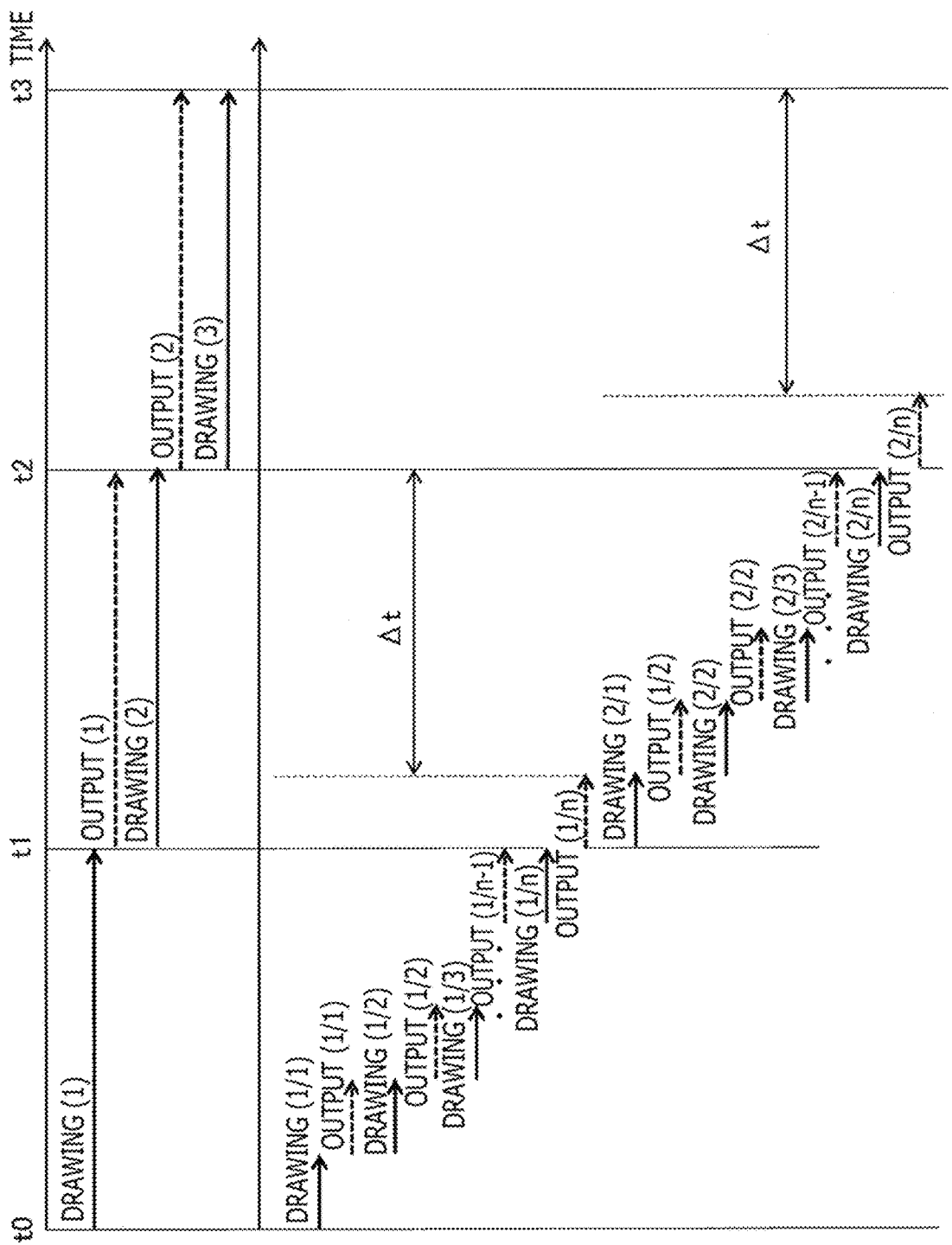

IMAGE GENERATION APPARATUS, HEAD-MOUNTED DISPLAY, CONTENT PROCESSING SYSTEM, AND IMAGE DISPLAY METHOD

CROSS REFERENCE TO RELATED APPLICATIONS

This application claims the benefit of Japanese Priority Patent Application JP 2019-185339 filed Oct. 8, 2019, the entire contents of which are incorporated herein by reference.

BACKGROUND

The present disclosure relates to a head-mounted display for displaying an image in front of the eyes of a user wearing the head-mounted display, an image generation device for processing a display image, a content processing system, and an image display method.

Image display systems enabling a user to view a target space from a desired point of view are in widespread use. Developed, for example, are the systems for displaying a panoramic image on a head-mounted display and displaying an image in accordance with the gaze direction of a user wearing a head-mounted display. Using the head-mounted display makes it possible to enhance the sense of immersion and improve the operability of a game or other application. In addition, a walk-through system is developed. When a user wearing the head-mounted display physically moves, the walk-through system enables the user to virtually walk in a space displayed as an image.

SUMMARY

The head-mounted display is featured in that it displays an image in front of the eyes of a viewer. Therefore, in order to provide comfortable viewing at a wide viewing angle, it is demanded that the head-mounted display generate a display image in a different manner from an ordinary image displayed on a flat-panel display. In the case of content created for viewing through the head-mounted display, such a special display image is generated during a process performed within the content.

Meanwhile, in a case where the head-mounted display is adapted to enable a user to view a large number of pieces of content created for display on a flat-panel display, it is necessary to perform separate processing on an already-generated display image. However, such processing is disadvantageous in terms, for example, of additional processing load, video delay caused by such processing, consumption of individual resources, responsiveness, and power consumption. Consequently, such processing is not easily implementable.

In view of the above circumstances, the present disclosure has been made to provide a technology for enabling a head-mounted display to display video not ready for display on the head-mounted display with a small delay, at a low cost, and with a low power consumption.

According to an embodiment of the present disclosure, there is provided an image generation device that generates a display image to be viewed through an eyepiece disposed in front of a display panel. The image generation device includes a source image reception control section, a distorted image generation section, a partially distorted image storage section, and an image display control section. The source image reception control section receives a source image. The distorted image generation section generates data on pixels in the display image that is obtained by giving the source image a distortion corresponding to the eyepiece. The partially distorted image storage section stores the data on the pixels in the order of data generation. Whenever data on a predetermined number of pixels smaller than the total number of pixels in the display image is stored in the partially distorted image storage section, the image display control section outputs the stored data to the display panel.

In the image generation device, the distorted image generation section may generate the data on the pixels in the display image by referencing a map indicating, on an image plane, a positional relationship between pixels in a distorted display image stored in the partially distorted image storage section and pixels in the source image or by calculating the positional relationship.

The image generation device may further include a data transfer control section. Whenever data on the predetermined number of pixels is stored in the partially distorted image storage section, the data transfer control section exercises control so as to transmit the data.

The image generation device may further include a user posture calculation section, a user posture value storage section, and a view screen projection determination section. The user posture calculation section acquires information regarding the posture of the head of a user wearing a head-mounted display having the display panel. The user posture value storage section stores the acquired information regarding the posture of the head of the user. The view screen projection determination section sets a view screen that defines the plane of the display image in accordance with the posture of the head of the user. The distorted image generation section may give the distortion to an image projected on the view screen.

The image generation device may further include a user controller instruction reception control section and a user controller input value storage section. The user controller instruction reception control section acquires a user instruction that determines whether the plane of the source image is to be fixed in a virtual space of a display target or fixed to the display panel. The user controller input value storage section stores the user instruction. In a mode for fixing the plane of the source image in the virtual space of the display target, the distorted image generation section may give the distortion to the image projected on the view screen.

In the image generation device, the map may indicate the positional relationship at discrete positions having fewer pixels than the display image. Based on a positional relationship obtained by interpolating the positional relationship indicated by the map, the distorted image generation section may generate data on all pixels in the display image.

In the image generation device, the distorted image generation section may generate the data on the pixels in the display image from the source image by combining a transformation based on the map determined by the structure of the eyepiece with a transformation based on a parameter not indicated by the map. At least either one of a pupillary distance of the user and the distance between the display panel and the eyes of the user may be used as the parameter not indicated by the map.

In the image generation device, the partially distorted image storage section may include a plurality of storage areas each having a capacity for storing data on the predetermined number of pixels. The distorted image generation section may switch the storage location of the data on the pixels in the display image between the plurality of storage areas.

In the image generation device, the plurality of storage areas included in the partially distorted image storage section may each have a capacity that is an integer multiple of the capacity of a unit area defined as a minimum unit of processing in the distorted image generation section.

In the image generation device, the source image may be an undistorted image generated for display on a flat-panel display.

According to another mode of the present disclosure, there is provided a head-mounted display including the above-described image generation device that generates a display image to be viewed through an eyepiece disposed in front of a display panel, the image generation device including a source image reception control section that receives a source image, a distorted image generation section that generates data on pixels in a display image obtained by giving the source image a distortion corresponding to the eyepiece, a partially distorted image storage section that stores the data on the pixels in an order of data generation, and an image display control section that, whenever data on a predetermined number of pixels smaller than a total number of pixels in the display image is stored in the partially distorted image storage section, outputs the stored data to the display panel. The display panel sequentially displays data that is transmitted from the image generation device.

According to yet another mode of the present disclosure, there is provided a content processing system including the above-described head-mounted display that includes an image generation device generating a display image to be viewed through an eyepiece disposed in front of a display panel, the image generation device including a source image reception control section that receives a source image, a distorted image generation section that generates data on pixels in a display image obtained by giving the source image a distortion corresponding to the eyepiece, a partially distorted image storage section that stores the data on the pixels in an order of data generation, and an image display control section that, whenever data on a predetermined number of pixels smaller than a total number of pixels in the display image is stored in the partially distorted image storage section, outputs the stored data to the display panel; the display panel that sequentially displays data outputted from the image generation device; and a content processing device. The content processing device generates the source image and transmits the generated source image to the head-mounted display.

In the content processing system, when a source image transmitted from the content processing device is displayable as is, the image display control section may output data on the source image to the display panel.

In the content processing system, at a time point when data on pixels in rows of a frame of the source image transmitted from the content processing device is acquired as necessary for determining one row of pixel values of the display image, the distorted image generation section starts a process of generating data on the one row of pixels.

According to still another mode of the present disclosure, there is provided an image display method used in an image generation device for generating a display image that is to be viewed through an eyepiece disposed in front of a display panel. The image display method includes: receiving a source image; generating data on pixels in the display image that is obtained by giving the source image a distortion corresponding to the eyepiece, and sequentially storing the generated data in a memory; and, whenever data on a predetermined number of pixels smaller than the total number of pixels in the display image is stored in the memory, outputting the stored data to the display panel.

Any combinations of the above-mentioned constituent elements and any conversions of expressions of the present disclosure, for example, between methods, devices, systems, computer programs, data structures, and recording media are also valid modes of the present disclosure.

According to the above-mentioned modes of the present disclosure, video not ready for display on a head-mounted display can be displayed on the head-mounted display with a small delay, at a low cost, and with a low power consumption.

BRIEF DESCRIPTION OF THE DRAWINGS

FIG. 5 is a diagram illustrating two modes that can be implemented in the embodiment to display a source image;

FIGS. 11A-11B illustrate the significance of the embodiment in terms of the time required for processing an undistorted image and displaying the processed image.

DETAILED DESCRIPTION OF THE PREFERRED EMBODIMENTS

Figure 1:
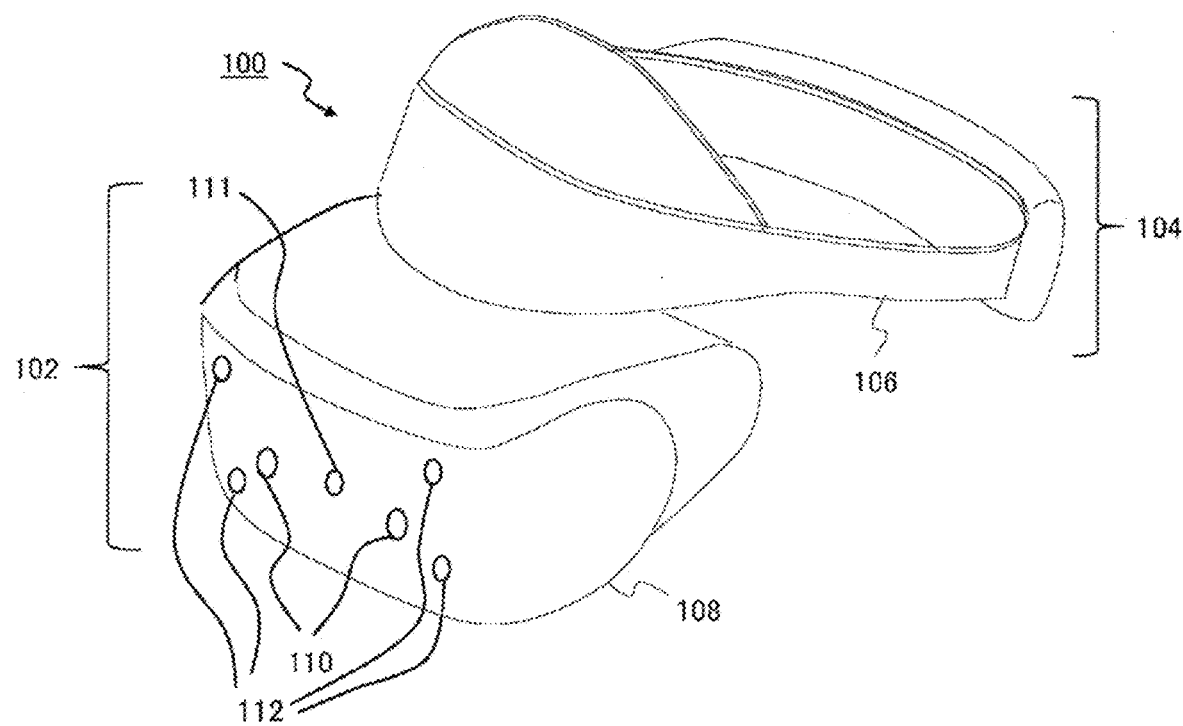
FIG. 1 is an example external view of a head-mounted display according to an embodiment of the present disclosure.

FIG. 1 illustrates an example external view of a head-mounted display 100 according to an embodiment of the present disclosure. In the illustrated example, the head-mounted display 100 includes an output mechanism section 102 and a wearing mechanism section 104. The wearing mechanism section 104 includes a wearing band 106. When worn by a user, the wearing band 106 surrounds the head of the user so as to secure the head-mounted display 100. The output mechanism section 102 includes a housing 108. The housing 108 is shaped so as to cover the left and right eyes of the user when the user wears the head-mounted display 100. The housing 108 includes a display panel that faces the eyes of the user when the user wears the head-mounted display 100.

The housing 108 additionally includes an eyepiece. When the user wears the head-mounted display 100, the eyepiece is placed between the display panel and the eyes of the user, and makes an enlarged image visible to the eyes of the user. Further, the head-mounted display 100 may additionally include speakers or earphones that are placed at positions corresponding to those of the ears of the user. Furthermore, the head-mounted display 100 has a built-in motion sensor that detects translational motions and rotational motions of the head of the user wearing the head-mounted display 100, and detects the position and posture of the user's head at each time point.

In the present example, the head-mounted display 100 includes stereo cameras 110, a monocular camera 111 with a wide viewing angle, and four other cameras 112 with a wide viewing angle, and shoots a video of a real space located in a direction corresponding to the orientation of the face of the user. The stereo cameras 110 are disposed on the front surface of the housing 108. The monocular camera 111 is disposed at the center of housing 108. The cameras 112 are disposed in four corners of the housing 108, namely, the upper left, upper right, lower left, and lower right corners of the housing 108. When an image captured by the stereo cameras 110 is instantly displayed, what is called video see-through is achieved so that the user is able to directly view a real space located in a direction in which the user is facing. Further, augmented reality is achieved when an image of a real object depicted in the captured image is displayed in superimposition upon an image of a virtual object reacting with the real object. Furthermore, when at least one of images captured by the above-mentioned seven cameras is analyzed by using a technology such as SLAM (simultaneous localization and mapping), it is possible to acquire information regarding the position and posture of the head-mounted display 100 relative to a surrounding space, and thus information regarding the position and posture of the user's head. It is also possible, for example, to achieve object recognition and make an object depth measurement.

Figure 2:
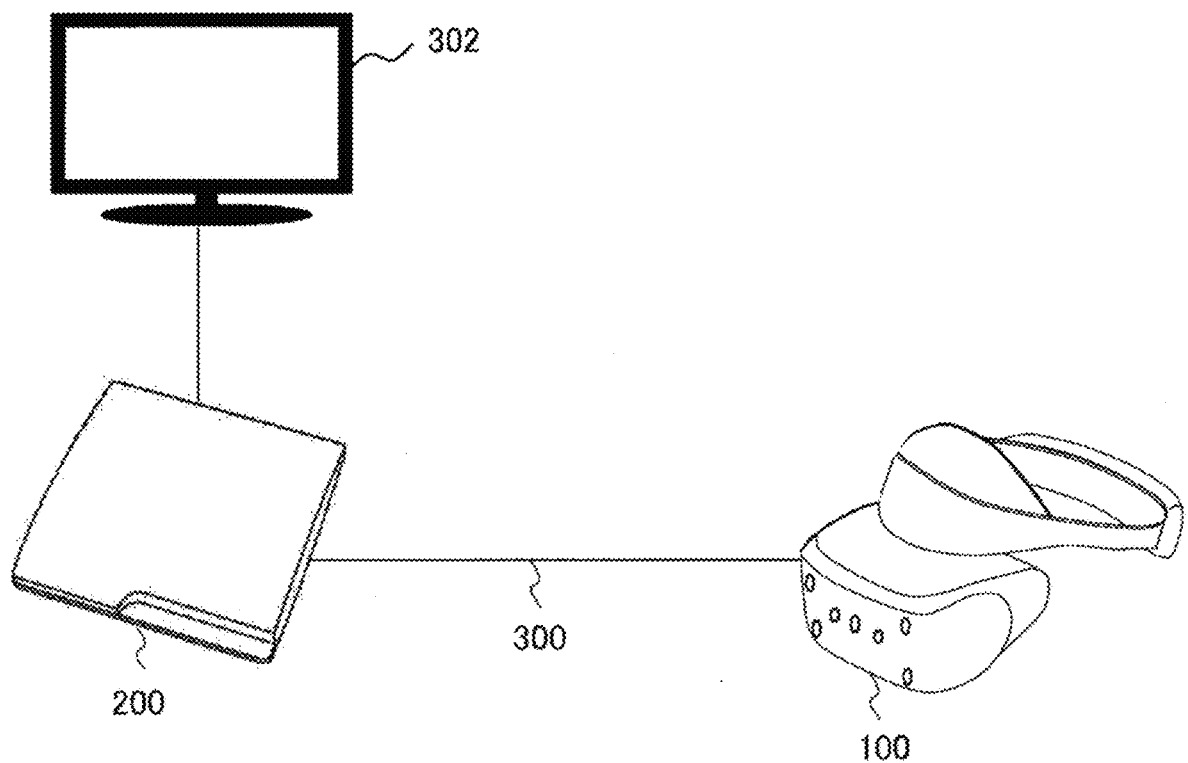
FIG. 2 is a diagram illustrating an example configuration of a content processing system according to the embodiment.

FIG. 2 illustrates an example configuration of a content processing system according to the present embodiment. The head-mounted display 100 is connected to a content processing device 200 through wireless communication or through an interface 300 connecting to a universal serial bus (USB) Type C or other peripheral. The content processing device 200 is connected to a flat-panel display 302. The content processing device 200 may be further connected to a server through a network. In such a case, the server may supply an online application, such as a game in which a plurality of users can participate through the network, to the content processing device 200.

The content processing device 200 basically processes a program of content to generate a display image, and transmits the generated display image to the head-mounted display 100 and the flat-panel display 302. In a certain mode, the content processing device 200 determines the position of a point of view and the direction of gaze in accordance with the position and posture of the head of the user wearing the head-mounted display 100, and generates a display image of the content at a predetermined rate so as to provide an appropriate field of view.

The head-mounted display 100 receives data on the display image and displays the received data as an image of the content. In such an instance, the purpose of displaying an image is not particularly limited. For example, the content processing device 200 may generate a display image depicting a virtual world serving as the stage of an electronic game while allowing the electronic game to progress, or may display a still image or a video image for purposes of appreciation or information provision no matter whether the displayed image depicts a virtual world or a real world.

The distance between the content processing device 200 and the head-mounted display 100 and the method of communication provided by the interface 300 are not limited. For example, the content processing device 200 may be a personally-owned gaming device, a server of a company providing cloud game and various distribution services, or a home server transmitting data to a terminal. Therefore, the communication between the content processing device 200 and the head-mounted display 100 may be established not only by using the method described in the above example, but also through a network or an access point such as the Internet or other public network, a local area network (LAN), a mobile phone carrier network, a Wi-Fi spot in town, or a home Wi-Fi access point.

Figure 3:
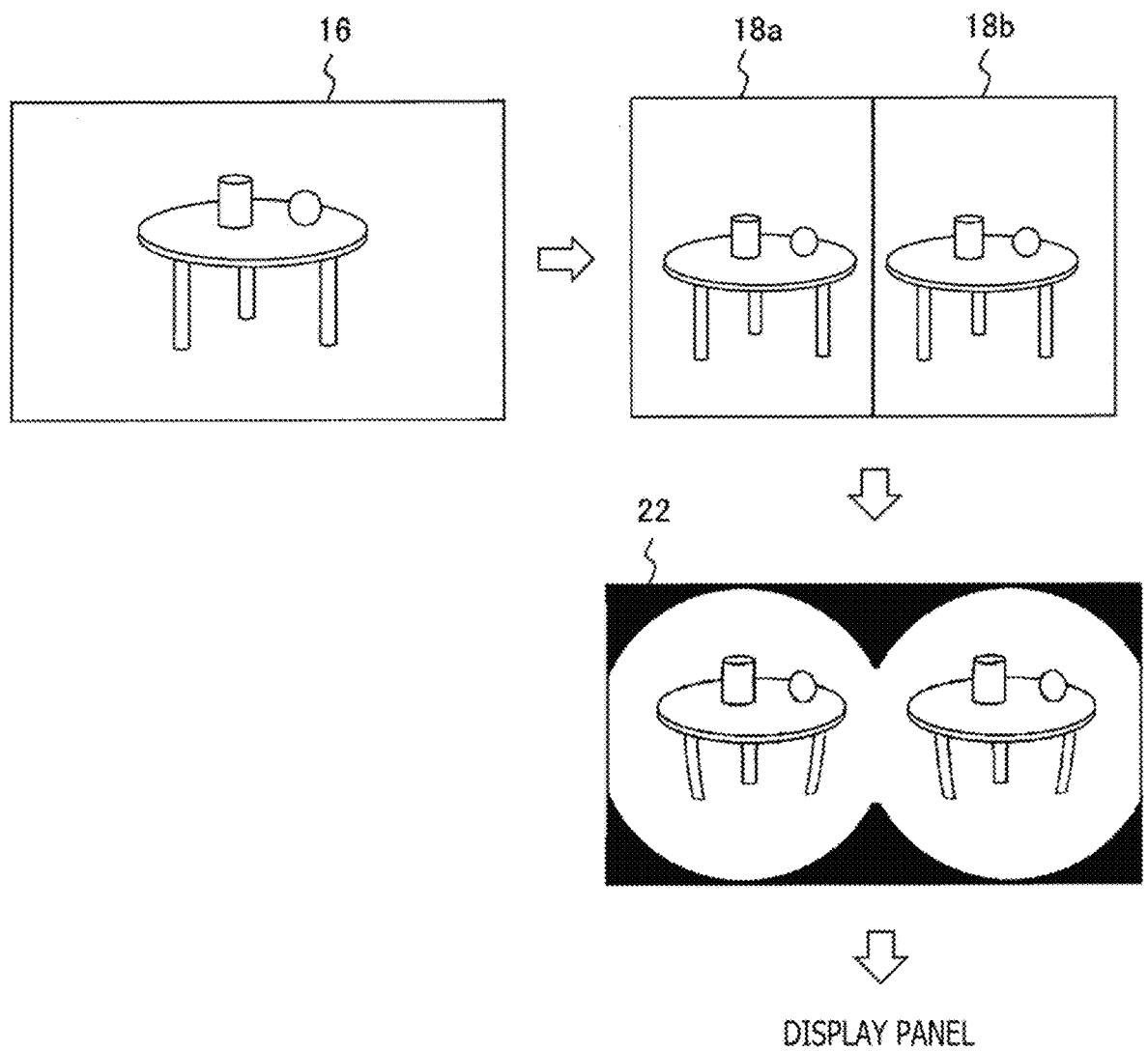
FIG. 3 is a diagram illustrating a process necessary for causing the head-mounted display to display an image that is to be displayed on a flat-panel display.

FIG. 3 is a diagram illustrating a process necessary for causing the head-mounted display 100 to display an image that is to be displayed on the flat-panel display 302. The example of FIG. 3 is for displaying a virtual space where an object, such as a table, exists. In this instance, first of all, an image 16 corresponding to the field of view of the user is drawn. A common computer graphics technology can be applied to such drawing. The image 16 represents the image to be visually recognized by the user, and is a common undistorted image.

When stereoscopic viewing is to be provided, a stereo image including a left-eye image 18a and a right-eye image 18b is generated from the image 16. The left-eye image 18a and the right-eye image 18b are images obtained by shifting the horizontal position of an object by a parallax that is determined by the interval between the left and right eyes and the distance to the object. Next, a final display image 22 is generated by subjecting the left-eye image 18a and the right-eye image 18b to inverse correction in accordance with a distortion caused by the eyepiece of the head-mounted display 100.

The above-mentioned inverse correction is a process of pre-distorting an image in a direction opposite to the distortion caused by a lens so that the original image 16 is visually recognizable when viewed through the eyepiece. For example, when the employed lens is such that the four sides of an image look as if they are concaved like a bobbin, the image is curved like a barrel beforehand. An image given a distortion corresponding to the employed lens is hereinafter referred to as a "distorted image." For example, the head-mounted display 100 acquires, at a predetermined frame rate, the display image 22 generated by the content processing device 200, and displays the acquired display image 22 as is on the display panel.

When the displayed image is viewed through a lens, the left eye of the user visually recognizes the left-eye image 18a, and the right eye of the user visually recognizes the right-eye image 18b. As a result, a video image of one frame of the image 16 is stereoscopically recognized. As regards content created for display on the head-mounted display 100, a process of generating a distorted image as the display image 22 as described above is commonly performed as a part of a content program.

Meanwhile, as regards content created for display on a flat-panel display or a screen, such as a conventional electronic game, a recorded video, a television program, or a movie, an undistorted image, such as the image 16, is generated as a display image at a predetermined frame rate. The same holds true for a system screen that is called by such content. If such an image is displayed as is on the head-mounted display, an image distorted by the eyepiece is visually recognized.

In view of the above circumstances, the present embodiment uses an integrated circuit that generates a distorted image suitable for display on the head-mounted display 100 from an undistorted image generated by a process within content. More specifically, the integrated circuit for outputting the display image 22 by using the image 16 depicted in FIG. 3 as input data is employed so that a large number of pieces of conventional content created for display on the head-mounted display 100 are easily viewable through the head-mounted display 100. This makes it easy to fuse or superimpose an image with a content image created for display on the head-mounted display 100.

When the above-described integrated circuit is incorporated in the head-mounted display 100, the content processing device 200 simply has to generate and output an undistorted image by processing conventional content in a usual manner no matter whether the head-mounted display 100 or the flat-panel display is used as a display destination. In some cases, an alternative is to incorporate the integrated circuit in the content processing device 200 and generate and output a distorted image when the display destination is the head-mounted display 100. The former case is hereinafter described as an example.

Figure 4:
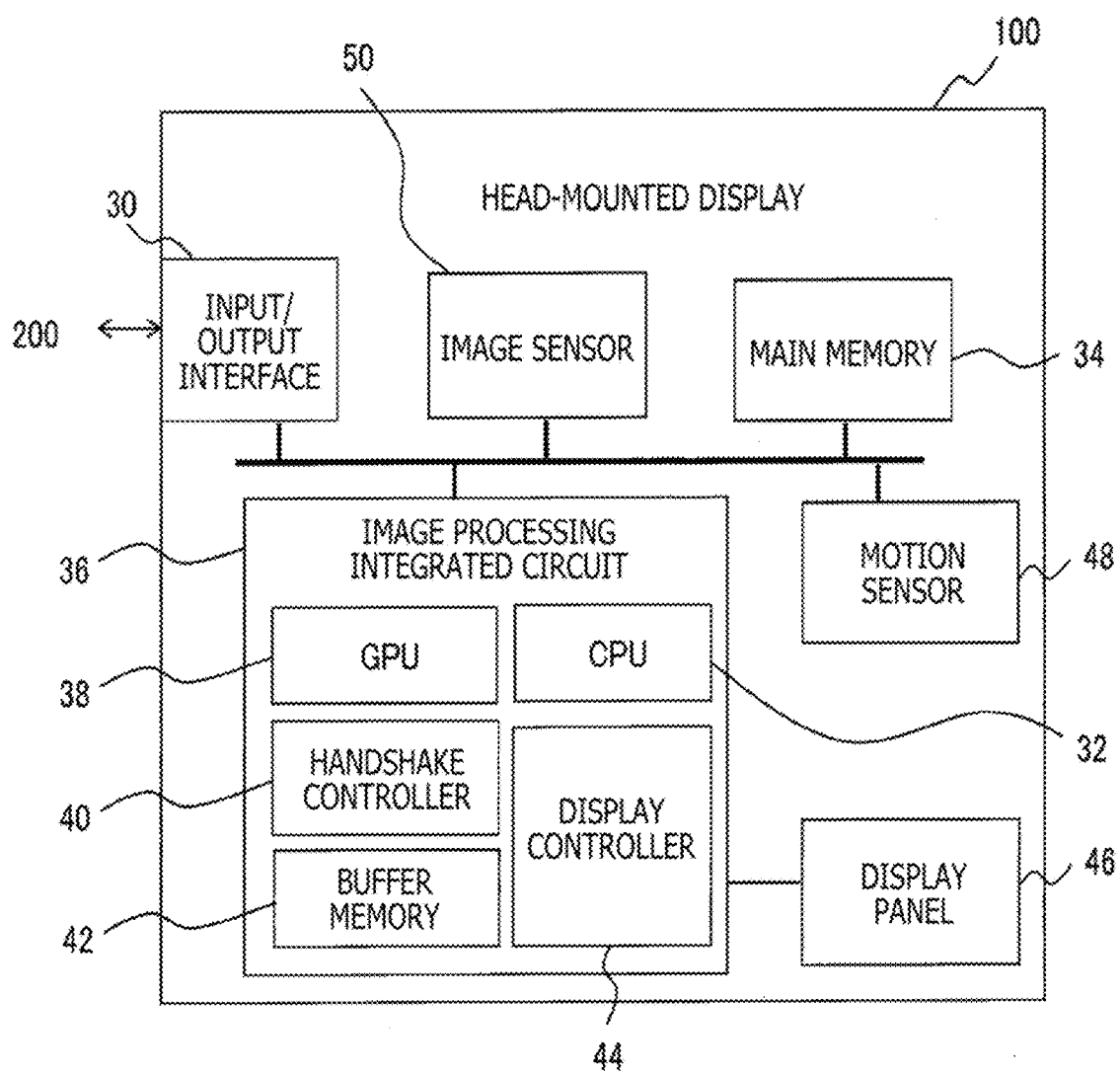
FIG. 4 is a diagram illustrating a circuit configuration of the head-mounted display according to the embodiment.

FIG. 4 illustrates a circuit configuration of the head-mounted display 100 according to the present embodiment. However, FIG. 4 depicts only the elements according to the present embodiment, and does not depict the other elements. The head-mounted display 100 includes an input/output interface 30, a main memory 34, an image processing integrated circuit 36, a motion sensor 48, an image sensor 50, and a display panel 46.

The input/output interface 30 establishes wired or wireless communication with the content processing device 200 in order to transmit and receive data. In the present embodiment, the input/output interface 30 mainly receives image data from the content processing device 200 at a predetermined rate. An image transmitted as data from the content processing device 200 may be referred to as a "source image." The input/output interface 30 may further receive audio data from the content processing device 200, and transmit a value measured by the motion sensor 48 and an image captured by the image sensor 50 to the content processing device 200.

The main memory 34 is a main storage section that is implemented, for example, by a DRAM (dynamic random-access memory) in order to store, for instance, data, parameters, and operation signals to be processed by a central processing unit (CPU) 32. Data on the source image transmitted from the content processing device 200 is temporarily stored in the main memory 34.

The image processing integrated circuit 36 includes the CPU 32, a graphics processing unit (GPU) 38, a buffer memory 42, a display controller 44, and a handshake controller 40. The CPU 32 controls the other circuits and the sensors. The GPU 38 draws a display image. The buffer memory 42 temporarily stores data on a drawn image. The display controller 44 transmits the display image to the display panel 46. The handshake controller 40 controls the transmission timing of the display image. The CPU 32 is a main processor that processes and outputs commands, data, and signals, such as image signals and sensor signals, in order to control the other circuits and the sensors.

The GPU 38 corrects or otherwise processes the source image, which is transmitted from the content processing device 200 and stored in the main memory 34, in order to draw a final image to be displayed. However, the data on the source image need not be temporarily stored in the main memory 34. An alternative is to avoid a delay of processing and an increase in the memory usage amount by allowing the GPU 38 to start processing without causing the main memory 34 to store the data on the source image. Further, a drawing process may be performed either by the CPU 32 or by the CPU 32 cooperating with the GPU 38. However, the following description is given as an example on the assumption that the drawing process is performed by the GPU 38.

The GPU 38 basically performs the drawing process on each of unit areas, which are formed by dividing an image plane, in order to reference texture data and perform TBDR (tile-based deferred rendering). Here, it is assumed that the unit areas are rectangular areas, for example, of 32×32 pixels or 64×64 pixels. The GPU 38 starts the drawing process upon each acquisition of data on the unit areas to be processed.

In a case where the source image is an undistorted image representative of each frame of video, the GPU 38 generates the left-eye image and the right-eye image as mentioned earlier, and applies inverse correction of lens distortion to each of the left- and right-eye images in order to generate an image formed by connecting the left- and right-eye images to each other. The GPU 38 may separately acquire a setting for the distance to an object to be displayed and generate the left- and right-eye images exactly in accordance with a parallax corresponding to the acquired setting for the distance, or may generate the left- and right-eye images by performing a simple process, for example, of applying a uniform parallax to all images. In any case, the GPU 38 generates the left- and right-eye images in such a manner that they look natural when viewed through an eyepiece having an optical axis of each of them.

The GPU 38 determines pixel values in raster order in accordance with the order in which the elements of the display panel 46 are driven. More specifically, from the top to the bottom of the image plane, the GPU 38 repeatedly performs a process of sequentially determining the pixel values in the rightward direction beginning with the upper left pixel in the image plane. For this purpose, a map indicating the positional relationship between pixels in an undistorted source image and corresponding pixels in a distorted display image is prepared. Then, for each pixel in the display image, the GPU 38 reads a plurality of values of neighboring pixels near a corresponding position in the source image, and performs a filtering process to determine the pixel value. For the filtering process of determining one pixel value by using neighboring pixels, various computation methods are proposed. Any one of such computation methods may be used.

However, a transformation formula for determining the positional relationship between pixels in a distorted image and pixels in the source image may be set instead of the above-mentioned map. Further, a factor for determining the pixel values of the display image is not limited to pixel displacement caused by the presence of distortion. For example, in a mode in which a three-dimensional virtual space where the source image is fixed is viewed through a head-mounted display, the position and posture of the source image relative to a display screen varies with the position and posture of the head-mounted display, that is, the position and posture of the user. Therefore, it is necessary to perform a process of projecting the plane of the source image, which is fixed in the three-dimensional space, to the view screen of the display screen, which is determined by the position and posture of the head-mounted display.

Accordingly, the pixel values are determined by combining the following parameters as appropriate with information regarding distortion determined based on the structure of the eyepiece.

1. The posture and orientation of the user based on an output value of the motion sensor 48 and the result of SLAM calculation.
2. The pupillary distance specific to the user (the distance between the left and right eyes of the user).
3. A parameter determined as a result of adjusting the wearing mechanism section 104 (wearing band 106) of the head-mounted display 100 in accordance with the relationship between the head and eyes of the user.

The pupillary distance mentioned under "2" above is acquired in a manner described below. In a case where the head-mounted display 100 includes gaze tracking stereo cameras, the gaze tracking stereo cameras capture an image of the pupils of the eyes of the user wearing the head-mounted display 100. As an alternative, the user may orient, for example, the stereo cameras 110 disposed on the front surface of the head-mounted display 100 toward the face of the user and capture an image of the face with open eyes. As another alternative, an undepicted camera outside the content processing system may be oriented toward the user to capture an image of the face with open eyes. The pupillary distance is then automatically measured and recorded by processing the image captured in the above-described manner through the use of image recognition software for the pupils of the eyes, which runs on the content processing system.

In a case where the camera-to-camera distance between the gaze tracking stereo cameras or between the stereo cameras 110 is used, triangulation is performed. As an alternative, the content processing system may display the captured image on the flat-panel display 302, allow the user to specify the positions of the pupils of the left and right eyes, and let the content processing device 200 calculate and record the pupillary distance between the left and right eyes in accordance with the specified positions of the pupils. Alternatively, the user may directly register the user's pupillary distance. The pupillary distance acquired in the above-described manner is then reflected on the distance between the left- and right-eye images within the display image 22 depicted in FIG. 3.

As regards "3" above, mechanical adjustment results concerning the wearing mechanism section 104 and the wearing band 106 are acquired by undepicted measuring instruments built in the head-mounted display 100, such as a rotary encoder and a variable resistor. The content processing system calculates the distance and angle between the eyepiece and the eyes of the user in accordance with the adjustment results. The parameter acquired in the above-described manner is reflected on the magnifications and positions of the images within the display image 22 depicted in FIG. 3.

The parameters described under "1" to "3" above are specific to the user wearing the head-mounted display 100 or variable with the position and posture of the user. Therefore, the parameters are not easily reflected on the map beforehand. Consequently, the GPU 38 may determine the final pixel values by combining a transformation based on the map with a transformation based on at least one of the parameters described under "1" to "3."

The GPU 38 sequentially stores the pixel values in the buffer memory 42 in the order of pixel value determination.

The GPU 38 monitors the number of processed pixels. The buffer memory 42 monitors the number of pixels whose values are stored. The display controller 44 monitors the number of outputted pixels. Under the control of a data transfer control section in the CPU 32, the handshake controller 40 constantly monitors a position in the buffer memory 42 in which the GPU 38 writes data and a position in the buffer memory 42 from which the display controller 44 reads data, and prevents a data deficiency, that is, a buffer underrun, and a data overflow, that is, a buffer overrun. Upon detecting a state where a buffer overrun may occur, the handshake controller 40 issues an instruction for data output suppression to the GPU 38.

Upon detecting a state where a buffer underrun may occur, the handshake controller 40 issues an instruction for data output acceleration to the GPU 38. If a buffer underrun or a buffer overrun occurs, it is reported to the data transfer control section operating in the CPU 32. The data transfer control section notifies the user of the occurrence of an abnormality and performs a transfer resumption process. Accordingly, whenever data on a predetermined number of pixels (hereinafter referred to as the transmission unit data) smaller than the total number of pixels in the display image is stored in the buffer memory 42 under the control of the GPU 38, the stored data is transmitted from the display controller 44 to the display panel 46.

The transmission unit data is, for example, the data on one row of the display image or the data on a plurality of rows that are obtained by equally dividing all the rows of the display image. In a case where the transmission unit data is the data on the plurality of rows, the size of the data is an integer multiple of the above-mentioned unit area defined as a minimum unit of processing for drawing by the GPU 38. As an example, data on a number of rows obtained by dividing the display image by 16 is assumed to be the transmission unit data.

As far as the data is transmitted in units smaller than the overall frame of the display image as described above, the actual time point when the handshake controller 40 establishes the communication between the GPU 38 and the display controller 44 is not particularly limited. In a case where the transmission unit data is the data on the plurality of rows, the GPU 38 does not have to determine the pixel values in raster order. Instead, the GPU 38 may perform processing by using a tile format obtained by bundling the plurality of rows. Within the transmission unit data, the order of pixel value determination may be different from the raster order.

As the above-described configuration is adopted, the size of the buffer memory 42 can be made significantly smaller than the size of one frame of the display image. For example, two storage areas for storing the transmission unit data, one for reading and the other for writing, may be prepared, or two or more ring buffers may be prepared as a storage area for storing the transmission unit data. In such a case, the buffer memory 42 can be incorporated in the image processing integrated circuit 36 as a SRAM (static random-access memory). This makes it possible to provide rapid access and reduce power consumption as compared with a mode in which a frame buffer is disposed in the main memory 34 such as a DRAM. The buffer memory 42 may be configured integrally with the main memory 34.

The display controller 44 displays an image by sequentially converting the transmission unit data read from the buffer memory 42 to electrical signals and driving the pixels of the display panel 46 at an appropriate time point. In a case where an initially distorted source image is used, the display controller 44 should display the source image on an as-is basis by similarly processing the source image stored in the main memory 34 to drive the display panel 46. However, in order to avoid a delay of processing and an increase in the memory usage amount, the source image may be processed without being stored in the main memory 34.

Information indicating whether the source image is ready for display on an as-is basis is transmitted from the content processing device 200 as additional data on the source image, and recognized by the CPU 32 that changes a subsequent operation accordingly. The display panel 46 has a common display mechanism such as a liquid-crystal display or an organic electroluminescence (EL) display, and displays an image in front of the eyes of the user wearing the head-mounted display 100. When the user views the image through the eyepiece, the user visually recognizes an undistorted image.

The motion sensor 48 detects posture information such as the rotation angle and inclination of the head-mounted display 100. The motion sensor 48 is implemented by combining, for example, a gyro sensor, an acceleration sensor, and an angular acceleration sensor as appropriate. The image sensor 50 corresponds to the stereo cameras 110 depicted in FIG. 1, and captures an image of the real world in the field of view corresponding to the position and orientation of the face of the user. The image sensor 50 is not limited to the stereo cameras 110, and may be one of the monocular camera 111 and the four other cameras 112 or a combination of them. The head-mounted display 100 may additionally include, for example, an audio circuit for allowing the user to listen to a sound and a peripheral interface circuit for connecting to a peripheral.

FIG. 5 is a diagram illustrating two modes that can be implemented in the present embodiment to display the source image. Two modes, namely, a "head space mode" and a "world space mode," can be implemented in the present embodiment. In the former mode, the plane of the source image is fixed with respect to the face of the user, that is, the display panel 46 of the head-mounted display 100. In the latter mode, the plane of the source image is fixed with respect to the virtual space of the display target as mentioned earlier. Meanwhile, as depicted in the perspective view 70 of FIG. 5, a yaw angle, a pitch angle, and a roll angle are defined relative to three axes of the head of the user. These parameters are acquired based on the output value of the motion sensor 48 and the result of SLAM calculation.

As depicted on the right side of FIG. 5, the source image in the head space mode coordinates with the orientation of the face of the user. Therefore, in the head space mode, the displacement of pixels toward the display image can be determined without regard to changes in the yaw angle, the pitch angle, and the roll angle. In the world space mode, however, the relative angle between the view screen for the display image and the plane of the source image varies with the changes in the yaw angle, the pitch angle, and the roll angle. Consequently, the displacement of pixels is dynamically determined based on such parameters.

Figure 6:
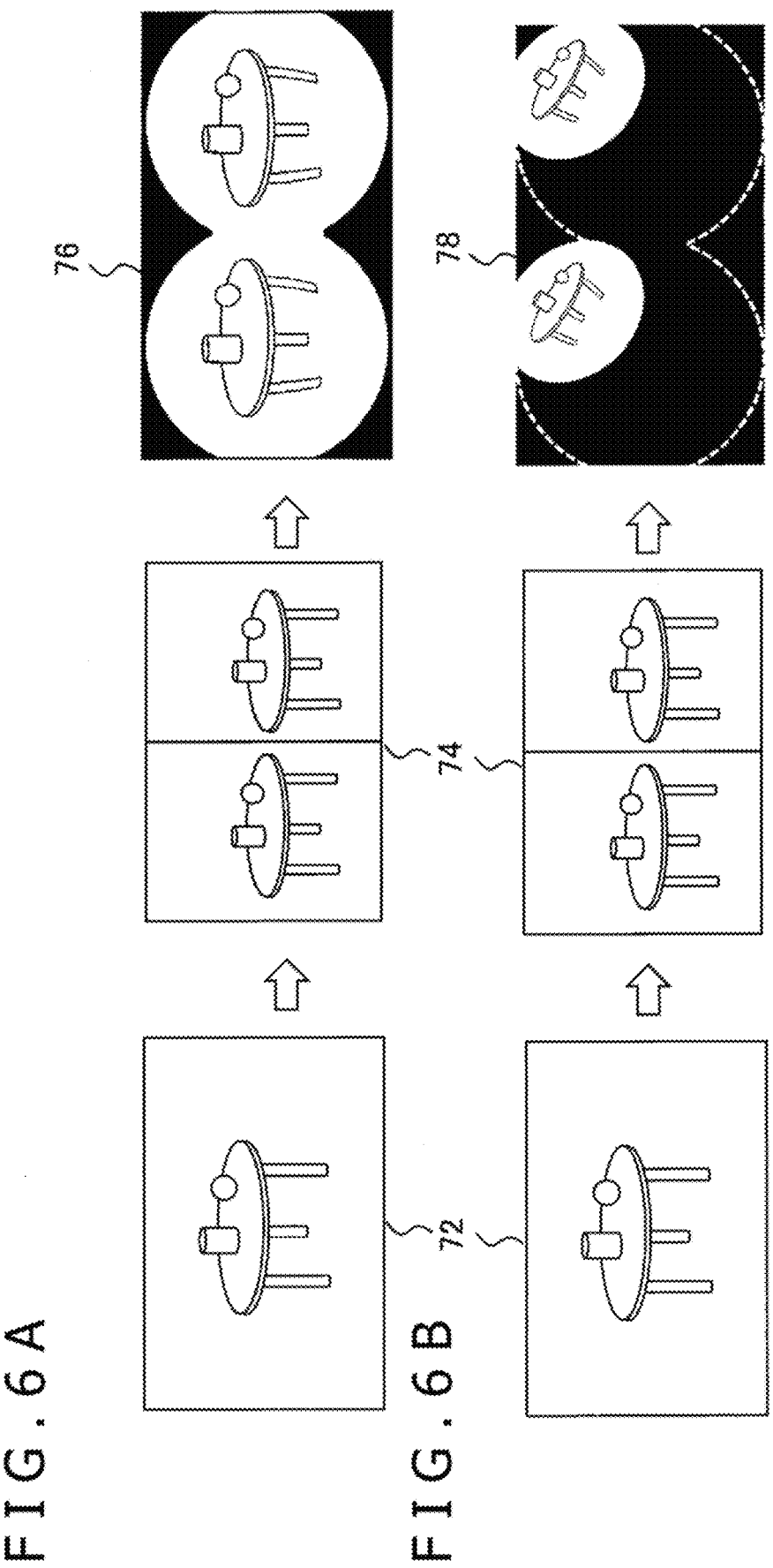
FIGS. 6A-6B depict a set of conceptual diagrams illustrating image changes necessary for displaying a source image on the head-mounted display in the embodiment.

FIGS. 6A-6B conceptually illustrate image changes necessary for displaying the source image on the head-mounted display. FIG. 6A relates to the head space mode, and FIG. 6B relates to the world space mode. In both of these two modes, a stereo image 74 on which a parallax is reflected is obtained from a source image 72, as is the case with the process described with reference to FIG. 3. In the head space mode depicted in FIG. 6A, the posture of the view screen relative to the plane of the source image remains unchanged. Therefore, a display image 76 is obtained by distorting the left and right images within the stereo image 74, as is the case with the process described with reference to FIG. 3.

In the world space mode depicted in FIG. 6B, the posture of the view screen relative to the source image varies with the posture of the head of the user. Therefore, a display image 78 is obtained by setting the view screen in accordance with the yaw angle, the pitch angle, and the roll angle, projecting the source image, and giving the projected source image to a distortion corresponding to the eyepiece. The broken line depicted within the display image 78 represents the boundary of the field of view, and is not actually displayed. When the above-described image is displayed, it looks as if a source image screen is floating in the darkness.

One of two depicted modes may be selected directly by the user or indirectly selected based on a change in another parameter. For example, one of the two modes may be selected based on the size of the source image displayed on the screen of the head-mounted display 100. In such a case, the world space mode may be selected if the size of the displayed source image is larger than a threshold value, and the head space mode may be selected if the size of the displayed source image is equal to or smaller than the threshold value. These two modes and switching between them are disclosed in International Publication WO 2017/051564.

Figure 7:
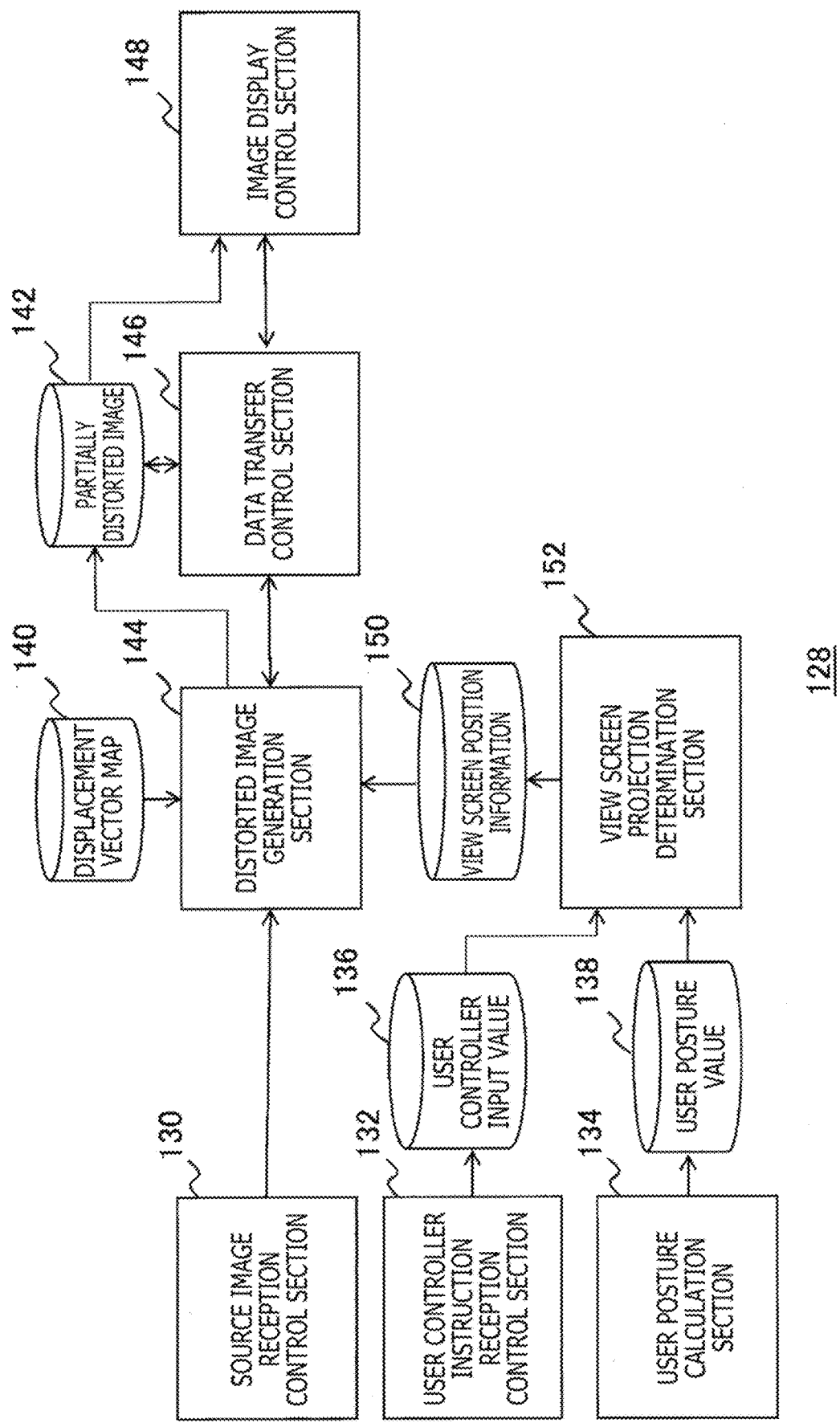
FIG. 7 is a diagram illustrating a configuration of functional blocks of an image processing device built in the head-mounted display according to the embodiment.

FIG. 7 illustrates a configuration of functional blocks of an image processing device 128 built in the head-mounted display 100. The depicted functional blocks can be implemented by hardware such as the image processing integrated circuit 36 depicted in FIG. 4 or implemented by software including programs loaded into the main memory 34, for example, from a recording medium in order to exercise various functions such as a data input function, a data retention function, an image processing function, and a communication function. Therefore, it will be understood by those skilled in the art that the functional blocks may be variously implemented by hardware alone, by software alone, or by a combination of hardware and software and are not to be limited to any of them.

A user controller instruction reception control section 132 included in the image generation device 128 is implemented by the CPU 32 and the input/output interface 30, and used to acquire information regarding a user operation for selecting either the head space mode or the world space mode. For example, the user inputs information for selecting either the head space mode or the world space mode, and then the user controller instruction reception control section 132 acquires the user-inputted information. A user controller input value storage section 136 eventually stores the acquired user-inputted information.

A user posture calculation section 134 is implemented, for example, by the CPU 32, the motion sensor 48, and the image sensor 50, and used to acquire information regarding the posture of the head of the user wearing the head-mounted display 100, that is, the above-mentioned yaw angle, pitch angle, and roll angle. As described earlier, these parameters can also be acquired by analyzing a captured image instead of the value measured by the motion sensor 48. The analysis may be made by the content processing device 200. A user posture value storage section 138 stores information regarding the posture of the head of the user. A view screen projection determination section 152 is implemented by the CPU 32 and the GPU 38, and used in the world space mode to set the view screen that defines the plane of the display image in accordance with the posture of the head of the user.

A view screen position information storage section 150 stores information regarding the position and posture in a virtual space of the view screen, which is set in the above-described manner. A source image reception control section 130 is implemented by the CPU 32 and the input/output interface 30, and used to receive a source image created for display on a flat-panel display. A displacement vector map storage section 140 stores a displacement vector map that is depicted in an image plane to indicate the positional relationship (displacement vector) between pixels in the display image given a distortion corresponding to the eyepiece and the corresponding pixels in the source image. A distorted image generation section 144 is implemented by the CPU 32 and the GPU 38, and used to generate data on the pixels in the display image that is obtained by giving the source image at least the distortion corresponding to the eyepiece.

In the world space mode, the distorted image generation section 144 projects a stereo image on the view screen as depicted in FIG. 6B and distorts the projected image in accordance with the information regarding the position and posture of the view screen, which is stored in the view screen position information storage section 150. Further, irrespective of the selected mode, the distorted image generation section 144 controls the interval between the left and right images and their magnifications during the generation of the stereo image in accordance with the pupillary distance and the distance and angle between the eyepiece and the eyes of the user, which are mentioned above.

A partially distorted image storage section 142 is implemented by the buffer memory 42, and used to store corrected pixel data in the order of pixel data generation. A data transfer control section 146 is implemented by the CPU, the handshake controller, and the buffer memory, and used to exercise control so as to transmit data on a predetermined number of pixels smaller than the total number of pixels in the display image each time the data is stored in the partially distorted image storage section 142. An image display control section 148 is implemented by the display controller 44 and the display panel 46, and used to display an image in accordance with the transmitted pixel data.

Figure 8:
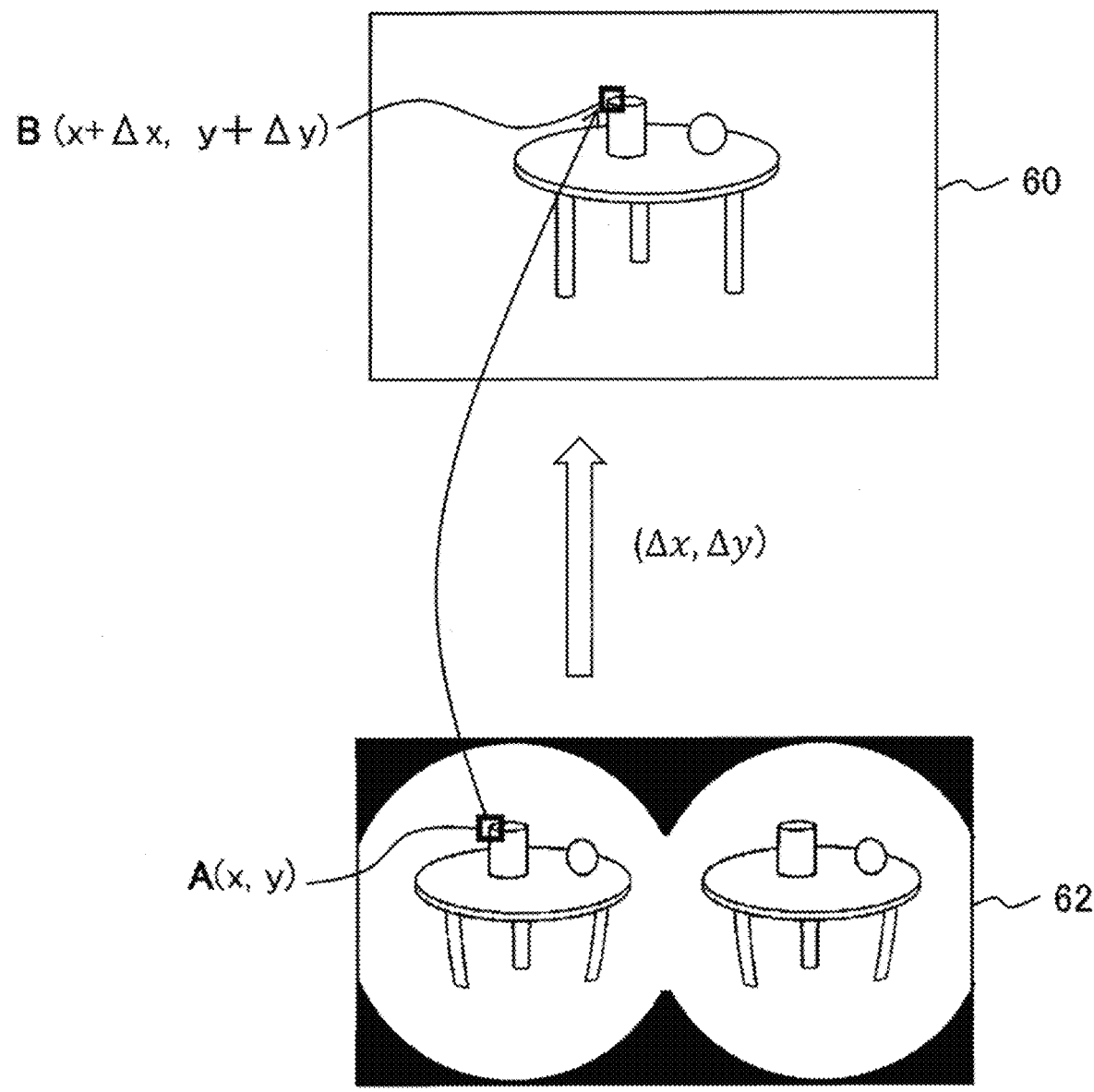
FIG. 8 is a diagram illustrating a process that is performed by a distorted image generation section in the embodiment in order to generate a distorted display image from an undistorted source image.

FIG. 8 is a diagram illustrating a process that is performed by the distorted image generation section 144 in order to generate a distorted display image from an undistorted source image. As described thus far, a distorted display image 62 to be displayed on the head-mounted display 100 is an image that is visually recognized as an undistorted image 60 when viewed through the eyepiece. If distorted images within the display image 62 are to be transformed to the undistorted image 60, processing performed for such a transformation is equivalent to a process of correcting a camera lens distortion in a common captured image. That is, the displacement vector $(\Delta x, \Delta y)$ of a pixel at position coordinates $(x, y)$ concerning the above transformation can be calculated from the following general equation.

[Math. 1]

$$\Delta x = (k_1 r^2 + k_2 r^4 + k_3 r^6 + \ldots)(x - c_x)$$

$$\Delta y = (k_1 r^2 + k_2 r^4 + k_3 r^6 + \ldots)(y - c_y) \quad \text{(Equation 1)}$$

In the above equation, r represents the distance between the optical axis of the eyepiece and a target pixel, and (Cx, Cy) represents the position of the optical axis of the eyepiece. Further, $k_1$, $k_2$, $k_3$, and so on are lens distortion coefficients and dependent on the design of the eyepiece. The degree of correction is not particularly limited. However, it should be noted that the equation used for correction is not limited to the above. In order to consider the horizontal displacement between an image within the source image and the images in the left- and right-eye areas of the display image 62 in addition to the above-described image distortion, the displacement $\Delta d$ is added to $\Delta x$ in Equation 1. The value $\Delta d$ is a constant based, for example, on the interval between the optical axes of lenses of the eyepiece.

Calculating the displacement vector $(\Delta x, \Delta y)$ in the above-described manner clarifies the position coordinates $(x+\Delta x, y+\Delta y)$ of pixel B in the image 60 (source image), which corresponds to pixel A at the position coordinates $(x, y)$ of the display image 62. The displacement vector $(\Delta x, \Delta y)$ can be calculated beforehand as a function of the position coordinates $(x, y)$ of the pixel in the display image. Therefore, the displacement vector map storage section 140 is disposed, for example, in the main memory 34 to store the displacement vector map, which indicates the displacement vector $(\Delta x, \Delta y)$ with respect to the image plane of the display image.

The displacement vector map may indicate the displacement vector with respect to all pixels in the display image or indicate the displacement vector only at discrete positions having fewer pixels than the display image. In the latter case, the distorted image generation section 144 acquires the displacement vector for each pixel in the display image by interpolating the displacement vector indicated by the displacement vector map.

Subsequently, the distorted image generation section 144 determines target pixels in the plane of the display image in raster order, identifies the corresponding positions in the source image in accordance with the displacement vector map, reads a plurality of values of neighboring pixels near pixels near the identified corresponding positions, and performs a filtering process on the read pixel values to determine the pixel values of the target pixels. For the filtering process of determining one pixel value by using neighboring pixels, various computation methods are proposed. Any one of such computation methods may be used. As a result, the pixel values can be determined on an individual pixel basis. Therefore, data transmission can be performed in units smaller than the whole image. However, as mentioned earlier, the pixel values may be determined by combining, as appropriate, the posture of the head-mounted display 100 and various parameters specific to the user.

Further, in some cases where a correction is to be made for lens distortion by using Equation 1, the eyepiece distortion coefficients may from one color to another. It should be noted that not only a common convex lens but also a Fresnel lens may be used as the eyepiece mounted on the head-mounted display 100. Although the Fresnel lens can be thinned, it is susceptible not only to resolution degradation but also to image distortion that concentrically increases toward the periphery of the field of view. Thus, nonlinear brightness changes may occur. Characteristics of such concentric brightness changes may vary with color, namely, red, green, or blue (refer, for example, to "Distortion," Edmund Optics Technical Data; [online] URL: https://www.edmundoptics.jp/resources/application-notes/imaging/distortion/reference). Furthermore, while the light-emitting elements of the pixels of the display panel have various color arrays, it is necessary that positions on the image plane agree with positions on the display panel on an individual subpixel basis. Accordingly, the displacement vector map may include components for making necessary corrections on an individual color basis.

Moreover, when a liquid-crystal panel is used as the display panel 46, the reaction speed is low although a high resolution can be achieved. Meanwhile, when an organic EL panel is used, a high resolution may not easily be achieved although the reaction speed is high, and what is called "Black Smearing" is likely to occur. Black Smearing is a phenomenon in which color bleeding occurs in a black region and its periphery. In addition to the above-mentioned correction for lens distortion, the distorted image generation section 144 may make corrections so as to avoid the above-described various adverse effects produced by the eyepiece and the display panel. In such an instance, the distorted image generation section 144 internally retains the characteristics of the display panel 46 together with the characteristics of the eyepiece. When, for example, a liquid-crystal panel is used, the distorted image generation section 144 resets liquid crystal by inserting a black image between frames, and thus increases the reaction speed. Further, when an organic EL panel is used, the distorted image generation section 144 offsets a brightness value and a gamma value for gamma correction in such a manner that color bleeding caused by Black Smearing is made inconspicuous.

Figure 9:
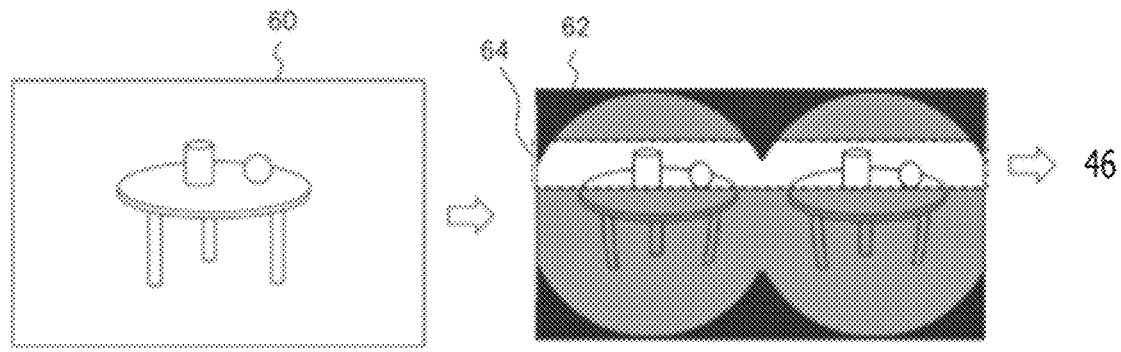
FIG. 9 is a diagram illustrating processing steps performed by the head-mounted display according to the embodiment.

FIG. 9 is a diagram illustrating processing steps performed by the head-mounted display 100. First of all, the content processing device 200 transmits an undistorted image 60 at a predetermined rate. The source image reception control section 130 in the head-mounted display 100 then acquires data on the image 60.

Subsequently, the distorted image generation section 144 generates a display image 62 that is given a distortion in the manner described with reference to FIGS. 6A-6B. In this instance, the distorted image generation section 144 may start generating the display image 62 without waiting until one complete frame of the image 60 is acquired. At a time point when data on a required number of rows is acquired for determining the pixel values of a row of the display image 62, the drawing of the row of the display image 62 can be started to further reduce latency associated with display.

In any case, the partially distorted image storage section 142 (buffer memory 42) sequentially stores data on pixels beginning with the uppermost row of the display image 62. At a time point when the transmission unit data is stored in the partially distorted image storage section 142 under the timing control of the data transfer control section 146, the image display control section 148 reads and displays the transmission unit data. When, for example, the transmission unit data 64 on the display image 62 is stored at a certain time point, a corresponding electrical signal drives the associated row of the display panel 46. Subsequently, the same process is repeatedly performed in a direction toward the bottom of the image until the display image 62 is entirely displayed.

Figure 10:
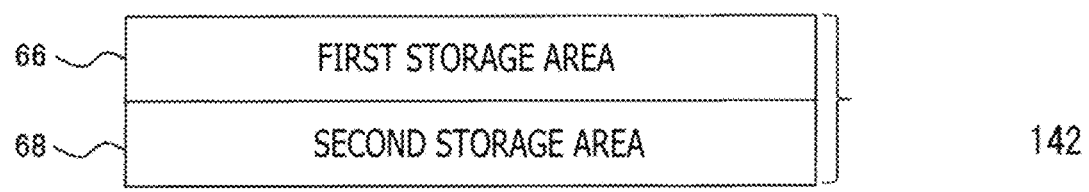
FIG. 10 is a diagram illustrating an example structure of a partially distorted image storage section in the embodiment.

FIG. 10 illustrates an example structure of the partially distorted image storage section 142. In the illustrated example, the partially distorted image storage section 142 includes a first storage area 66 and a second storage area 68. The first and second storage areas 66 and 68 are both sized to match the size of the transmission unit data. The data is written into one storage area. When the size of the transmission unit data is reached, the data in the one storage area begins to be read while the next data is written into the other storage area. This process is repeated so as to write and read the data while interchanging the roles of the two storage areas.

As mentioned earlier, it is assumed that the unit of transmission to the display panel 46 in a certain mode is an integer multiple of a unit area defined as the minimum unit of texture data referencing during the drawing process of the GPU 38 forming the distorted image generation section 144 and processing for tile-based deferred rendering. In this case, the first storage area 66 and second storage area 68 of the partially distorted image storage section 142 each have a capacity that is an integer multiple of the unit area.

Three or more areas for individual transmission unit data may be disposed in the partially distorted image storage section 142 and cyclically used. Using three or more storage areas makes it possible to prevent a failure where a read-out is delayed due to a subtle speed difference between a data write-in and a data read-out so that data not read out yet is soon overwritten by new data.

FIGS. 11A-11B illustrate the significance of the present embodiment in terms of the time required for processing an undistorted image and displaying the processed image. In FIGS. 11A-11B, the horizontal direction represents elapsed time, the solid-line arrows represent the time of display image drawing by the distorted image generation section 144, and the broken-line arrows represent the time of output to the display panel 46. As regards parenthesized descriptions affixed to "DRAWING" or "OUTPUT," (m) indicates a process performed on one frame having the frame number m, and (m/n) indicates the nth process performed on transmission unit data having the frame number m. FIG. 11A indicates, as a comparative example, a mode in which one frame of display image is stored in the main memory 34 before being outputted to the display panel.

More specifically, during a period between time t0 and time t1, the first frame is drawn and its data is stored in the main memory 34. At time t1, the second frame begins to be drawn, and the data on the first frame is sequentially read from the main memory 34 and outputted to the display panel 46. Such processing is completed at time t2, and then the third frame is drawn and the second frame is outputted. Subsequently, the individual frames are drawn and outputted in the same cycle. In such an instance, the time required between the start of drawing of one frame of display image and the completion of its output is equal to the output cycle of two frames.

According to the present embodiment depicted in FIG. 6B, at a time point when the drawing of the first transmission unit data on the first frame is completed, it is read from the partially distorted image storage section 142 and outputted to the display panel 46. During such a period, the second transmission unit data is drawn. Therefore, subsequently to the first transmission unit data, the second transmission unit data can be outputted to the display panel 46. When such an operation is repeated, at time t1 at which the drawing of the last (nth) transmission unit data is completed, the output of the second last (n−1th) transmission unit data is already terminated. The subsequent frames are similarly outputted to the display panel 46 in parallel with the drawing process.

Consequently, the time required between the start of drawing of one frame of display image and the completion of its output is equal to a value that is obtained by adding the output time of one piece of output unit data to the output cycle of one frame. That is, as compared with a mode depicted in FIG. 11A, the required time is reduced by Δt, which is close to the output cycle of one frame. This signifies that undistorted images transmitted at time points t0, t1, t2, and so on can be displayed with a small delay in a state suitable for the head-mounted display 100. As a result, the displayed images are unlikely to give a feeling of strangeness even if they are compared with a case where images initially suitable for the head-mounted display 100 are transmitted.

The foregoing description relates to processing inside the image generation device 128. However, processing may be performed in a similar manner even in a case where the image generation device 128 performs decompression to decode source image data that is compression-encoded in the content processing device 200, such as a cloud server, and is subjected to a streaming transfer. That is, the content processing device 200 and the image generation device 128 may perform compression encoding, decompression decoding, and motion compensation on each of unit areas obtained by dividing a frame plane.

Here, it is assumed that the unit areas are areas obtained by horizontally dividing a predetermined number of rows of pixels, such as one row of pixels or two rows of pixels, or rectangular areas, for example, of 16×16 pixels or 64×64 pixels, obtained by dividing the pixels in both horizontal and vertical directions. Each time processing target data on a unit area is acquired, the content processing device 200 and the image generation device 128 start a compression-encoding process and a decompression-decoding process, respectively, and output the resulting processed data on an individual unit area basis. This makes it possible to further reduce the delay time for display, including the time required for data transmission from the content processing device 200.

According to the present embodiment, which has been described above, an integrated circuit for arranging a generated image in a format suitable for display is mounted, for example, in a head-mounted display. The integrated circuit is configured so as to transmit transmission unit data having a size smaller than one frame to a display panel whenever the transmission unit data is stored in a buffer memory. This makes it possible to use, for example, a small-capacity SRAM as the buffer memory. As a result, the buffer memory can easily be mounted in the same integrated circuit.

In a case where a common method is employed for disposing a buffer for storing the whole frame, for example, in a large-capacity DRAM, it is necessary to transmit a large amount of data on drawn images. In this case, a transmission path is likely to become complex due to a problem with a processing circuit board layout. For high-speed transmission, a plurality of DRAMs may be disposed in a parallel manner to reduce bus width. However, the use of parallelly disposed DRAMs will increase the cost of production.

The small-capacity buffer memory according to the present embodiment makes it possible to provide rapid access at a low cost and reduce the power consumption for transmission. Further, the output to the display panel starts without waiting until one frame is drawn. This makes it possible to minimize the time interval between the acquisition of an original image and its display. In a case where a head-mounted display is used, a problem is likely to occur with respect to the responsiveness of a display image to the motion of a user's head or to a user operation. More specifically, the delay time for display may not only damage the sense of presence, but also cause physical condition deterioration such as visual motion sickness.

According to the present embodiment, conventional content not created for display on a head-mounted display can be displayed with a small delay. As a result, it is possible to easily and comfortably enjoy various videos through a head-mounted display without regard to a display format specified by content.

While the present disclosure has been described in conjunction with an embodiment, it will be understood by those skilled in the art that the embodiment is illustrative and not restrictive, and that the combination of constituent elements and individual processes in the embodiment may be variously modified, and further that such modifications also fall within the scope of the present disclosure.

What is claimed is:

1. An image generation device that generates a display image to be viewed through an eyepiece disposed in front of a display panel, the image generation device comprising:
    a source image reception control section that receives a source image from a content processing device;
    a distorted image generation section that generates data on pixels in a display image obtained by giving the source image a distortion corresponding to the eyepiece;
    a partially distorted image storage section that stores the data on the pixels in an order of data generation; and
    an image display control section that, whenever data on a predetermined number of pixels smaller than a total number of pixels in the display image is stored in the partially distorted image storage section, outputs the stored data to the display panel,
    wherein, the source image reception control section constantly monitors reception of each row of pixels of the display image and instructs the distorted image generation section to start a process of generating data for each row of pixels after it is determined that each row of pixels is received by the source image reception control section.

2. The image generation device according to claim 1, wherein the distorted image generation section generates the data on the pixels in the display image by referencing a map,
    wherein the map is a displacement vector map that indicates a positional relationship between pixels in the display image given the distortion corresponding to the eyepiece and corresponding pixels in the source image.

3. The image generation device according to claim 2, wherein the map indicates the positional relationship at discrete positions having fewer pixels than the display image, and
    wherein, based on a positional relationship obtained by interpolating the positional relationship indicated by the map, the distorted image generation section generates data on all pixels in the display image.

4. The image generation device according to claim 1, further comprising:
    a data transfer control section that, whenever data on the predetermined number of pixels is stored in the partially distorted image storage section, exercises control so as to transmit the data.

5. The image generation device according to claim 1, further comprising:
    a user posture calculation section that acquires information regarding a posture of a head of a user wearing a head-mounted display having the display panel;
    a user posture value storage section that stores the acquired information regarding the posture of the head of the user; and
    a view screen projection determination section that sets a view screen configured to define a plane of the display image in accordance with the posture of the head of the user,
    wherein the plane of the display image is fixed with respect to a face of the user, and
    wherein the distorted image generation section gives the distortion to an image projected on the view screen.

6. The image generation device according to claim 5, further comprising:
    a user controller instruction reception control section that acquires a user instruction determining whether the plane of the source image is to be fixed in a virtual space of a display target or fixed to the display panel; and a user controller input value storage section that stores the user instruction, wherein, in a mode for fixing the plane of the source image in the virtual space of the display target, the distorted image generation section gives the distortion to the image projected on the view screen.

7. The image generation device according to claim 1, wherein the partially distorted image storage section includes a plurality of storage areas each having a capacity for storing data on the predetermined number of pixels, and wherein the distorted image generation section switches a storage location of the data on the pixels in the display image between the plurality of storage areas.

8. The image generation device according to claim 7, wherein a plurality of the storage areas included in the partially distorted image storage section each have a capacity that is an integer multiple of the capacity of a unit area defined as a minimum unit of processing in the distorted image generation section.

9. The image generation device according to claim 1, wherein the source image is an undistorted image generated for display on a flat-panel display.

10. A head-mounted display comprising:

an image generation device that generates a display image to be viewed through an eyepiece disposed in front of a display panel, the image generation device including a source image reception control section that receives a source image from a content processing device, a distorted image generation section that generates data on pixels in a display image obtained by giving the source image a distortion corresponding to the eyepiece, a partially distorted image storage section that stores the data on the pixels in an order of data generation, and an image display control section that, whenever data on a predetermined number of pixels smaller than a total number of pixels in the display image is stored in the partially distorted image storage section, outputs the stored data to the display panel; and the display panel that sequentially displays data outputted from the image generation device, wherein, the source image reception control section constantly monitors reception of each row of pixels of the display image and instructs the distorted image generation section to start a process of generating data for each row of pixels after it is determined that each row of pixels is received by the source image reception control section.

11. A content processing system comprising:

a head-mounted display that includes an image generation device generating a display image to be viewed through an eyepiece disposed in front of a display panel, the image generation device including a source image reception control section that receives a source image, a distorted image generation section that generates data on pixels in a display image obtained by giving the source image a distortion corresponding to the eyepiece, a partially distorted image storage section that stores the data on the pixels in an order of data generation, and an image display control section that, whenever data on a predetermined number of pixels smaller than a total number of pixels in the display image is stored in the partially distorted image storage section, outputs the stored data to the display panel;

the display panel that sequentially displays data outputted from the image generation device; and a content processing device that generates the source image and transmits the generated source image to the head-mounted display, wherein, the source image reception control section constantly monitors reception of each row of pixels of the display image and instructs the distorted image generation section to start a process of generating data for each row of pixels after it is determined that each row of pixels is received by the source image reception control section.

12. The content processing system according to claim 11, wherein, when a source image transmitted from the content processing device is displayable as is, the image display control section outputs data on the source image to the display panel.

13. An image display method used in an image generation device that generates a display image that is to be viewed through an eyepiece disposed in front of a display panel, the image display method comprising:

receiving a source image from a content processing device;

generating data on pixels in the display image that is obtained by giving the source image a distortion corresponding to the eyepiece, and sequentially storing the generated data in a memory;

constantly monitor reception of each row of pixels of the display image;

begin a process of generating data for each row of pixels after it is determined that each row of pixels is received; and whenever data on a predetermined number of pixels smaller than a total number of pixels in the display image is stored in the memory, outputting the stored data to the display panel, constantly monitor reception of each row of pixels of the display image;

begin a process of generating data for each row of pixels after it is determined that each row of pixels is received.

14. A non-transitory computer readable medium having stored thereon a computer program for a computer generating a display image that is to be viewed through an eyepiece disposed in front of a display panel, comprising:

by a source image reception control section, receiving a source image from a content processing device;

by a distorted image generation section, generating data on pixels in the display image that is obtained by giving the source image a distortion corresponding to the eyepiece;

by a partially distorted image storage section, sequentially storing the generated data in a memory; and by an image display control section, whenever data on a predetermined number of pixels smaller than a total number of pixels in the display image is stored in the memory, outputting the stored data to the display panel, wherein, the source image reception control section constantly monitors reception of each row of pixels of the display image and instructs the distorted image generation section to start a process of generating data for each row of pixels after it is determined that each row of pixels is received by the source image reception control section.

* * * * *